United States Patent
Pachet et al.

(10) Patent No.: US 11,593,702 B2
(45) Date of Patent: Feb. 28, 2023

(54) METHODS, SYSTEMS AND COMPUTER PROGRAM PRODUCTS FOR GENERATING A TRAINING SET FOR USE DURING CONTENT GENERATION

(71) Applicant: Spotify AB, Stockholm (SE)

(72) Inventors: François Pachet, Stockholm (SE); Pierre Roy, Stockholm (SE)

(73) Assignee: Spotify AB, Stockholm (SE)

( * ) Notice: Subject to any disclaimer, the term of this patent is extended or adjusted under 35 U.S.C. 154(b) by 903 days.

(21) Appl. No.: 16/434,668

(22) Filed: Jun. 7, 2019

(65) Prior Publication Data
US 2020/0074343 A1 Mar. 5, 2020

(51) Int. Cl.
G06N 20/00 (2019.01)
G06F 30/20 (2020.01)
G06F 111/10 (2020.01)

(52) U.S. Cl.
CPC .............. *G06N 20/00* (2019.01); *G06F 30/20* (2020.01); *G06F 2111/10* (2020.01)

(58) Field of Classification Search
CPC ...... G06N 20/00; G06F 30/20; G06F 2111/10
See application file for complete search history.

(56) References Cited

U.S. PATENT DOCUMENTS

| 9,110,817 | B2 | 8/2015 | Pachet et al. |
| 2010/0100511 | A1 | 4/2010 | Hirose et al. |
| 2010/0299328 | A1 | 11/2010 | Pachet |
| 2011/0010321 | A1 | 1/2011 | Pachet et al. |
| 2012/0246209 | A1 | 9/2012 | Pachet et al. |
| 2013/0103624 | A1* | 4/2013 | Thieberger ........... G06K 9/6256 706/12 |
| 2014/0279760 | A1 | 9/2014 | Aliferis et al. |
| 2015/0127669 | A1 | 5/2015 | Roy et al. |
| 2016/0247496 | A1 | 8/2016 | Pachet et al. |
| 2017/0026748 | A1 | 1/2017 | Gorlow et al. |
| 2019/0065443 | A1* | 2/2019 | Baba ................... G06F 40/151 |

OTHER PUBLICATIONS

Gururani, Siddharth, and Alexander Lerch. "Automatic Sample Detection in Polyphonic Music." In ISMIR, pp. 264-271. 2017. (Year: 2017).*

Extended European Search Report from European Application No. 19195376.9, dated Feb. 7, 2020.

European Summons to attend oral proceedings in Application 19195376.9, dated Oct. 28, 2021, 10 pages.

(Continued)

*Primary Examiner* — Michael Jung
(74) *Attorney, Agent, or Firm* — Merchant & Gould P.C.

(57) ABSTRACT

A training set for use during content generation is generated by applying a first machine learning process P1 to a first finite sequence s wherein s has a length Ls, to generate a first statistical model M(s). The first statistical model M(s) is sampled using a first sampling process G to generate a second finite sequence t wherein t has a length Lt. A second machine learning process P2 is applied to the second finite sequence t to generate a second statistical model M(t), wherein no substring of the second finite sequence t of length d is identical to a substring of the first finite sequence s, wherein d is a predetermined number of elements in a sequence.

15 Claims, 6 Drawing Sheets

(56) References Cited

OTHER PUBLICATIONS

Office Action Communication from European Appln No. 19195376.9, dated Oct. 14, 2020.
Sobroto, Iman Much Ibnu, et al., "Plagiarism Detection through Internet using Hybrid Artificial Neural Network and Support Vectors Machine." Telkomnika, vol. 12, No. 1, Mar. 2014, pp. 209-218.
J. Burgoyne et al., "Hooked: A Game for Discovering What Makes Music Catchy", Proceedings of the 14th Society of Music Information Retrieval Conference (ISMIR) (2013).
Jean-Marc Deltorn, "Deep creations: Intellectual property and the automata", Frontiers in Digital Humanities 4:3 (2017).
Eliot Van Buskirk, "Hear the Most 'Dramatic' Part of Any Song on Spotify", Spotify Insights (2014).
Reggie Ugwu, "Here's What Makes a Song a Ripoff, According to the Law", BuzzFeed (2015). Available at: https://www.buzzfeed.com/reggieugwu/what-the-law-says-about-music-plagiarism.
I. Korsmit et al., "If You Wanna Be My Lover . . . A Hook Discovery Game to Uncover Individual Differences in Long-term Musical Memory", Proc. of the 25th Anniviversary Conf. of the European Society for the Cognitive Sci. of Music, Jul. 31-Aug. 4, Ghent, Belgium (2017).
A. Papadopoulos et al., "Avoiding Plagiarism in Markov Sequence Generation", Twenty-Eighth AAAI Conference on Artificial Intelligence (2014).
P. Rabbat et al., "Direct and Inverse Inference in Music Databases: How to Make a Song Funk?", ISMIR (2008).
G. Sargent et al., "Estimating the structural segmentation of popular music pieces under regularity constraints", IEEE/ACM Transactions on Audio, Speech, and Language Processing 25.2: 344-358 (2016).
G. Sargent et al., "Supplementary material to the article: Estimating the structural segmentation of popular music pieces under regularity constraints" (2016).
F. Bimbot et al., "Semiotic structure annotation" (2012). Available at: http://musicdata.gforge.inria.fr/structureAnnotation.html.
P. Lamere "The Drop Machine", Music Machinery (2015). Available at: https://musicmachinery.com/2015/06/16/the-drop-machine/.
"MOSI—Hooked on Music", accessed Oct. 4, 2017. Available at: http://www.hookedonmusic.org.uk/.
Papadopoulos et al., "Generating Non-plagiaristic Markov Sequences with Max Order Sampling", Creativity and Universality in Language. Lecture Notes in Morphogenesis (2016).
Office Action from Swedish Patent Application No. 1851056-0, dated Mar. 15, 2019.
J.-P. Briot et al., "Deep Learning Techniques for Music Generation—A Survey", arxiv.org/abs/1709.01620v1 (Sep. 5, 2017).
M. Robine et al., "Adaptation of String Matching Algorithms for Identification of Near-Duplicate Music Documents", Workshop on Plagiarism Analysis, Authorship Identification, and Near-Duplicate Detection (PAN07), Amsterdam, Netherlands, Jul. 2007, pp. 37-43.
European Decision to Refuse Patent Application in Application 19195376.9, dated May 6, 2022, 4 pages.

* cited by examiner

METHODS, SYSTEMS AND COMPUTER PROGRAM PRODUCTS FOR GENERATING A TRAINING SET FOR USE DURING CONTENT GENERATION

This application claims benefit of Application No. 1851056-0, filed 5 Sep. 2018 in the Sweden, which is incorporated herein by reference in its entirety. To the extent appropriate, a claim of priority is made to the above-disclosed application.

BACKGROUND

I. Field

Example aspects described herein relate generally to the field of music content synthesis, and more particularly to generating a non-plagiaristic training set that is invariant from an original training set, such that the two training sets generate equivalent statistical models for use in music content synthesis.

II. Related Art

Artificial intelligence (AI) is increasingly being used to produce content in many domains, such as sequential content in the domains of music and text. In the domain of music, for instance, AI also has been used to generate symbolic music (e.g., sequences of notes, chords, complex sequences of polyphonic material, or so-called lead sheets).

Figure 1:
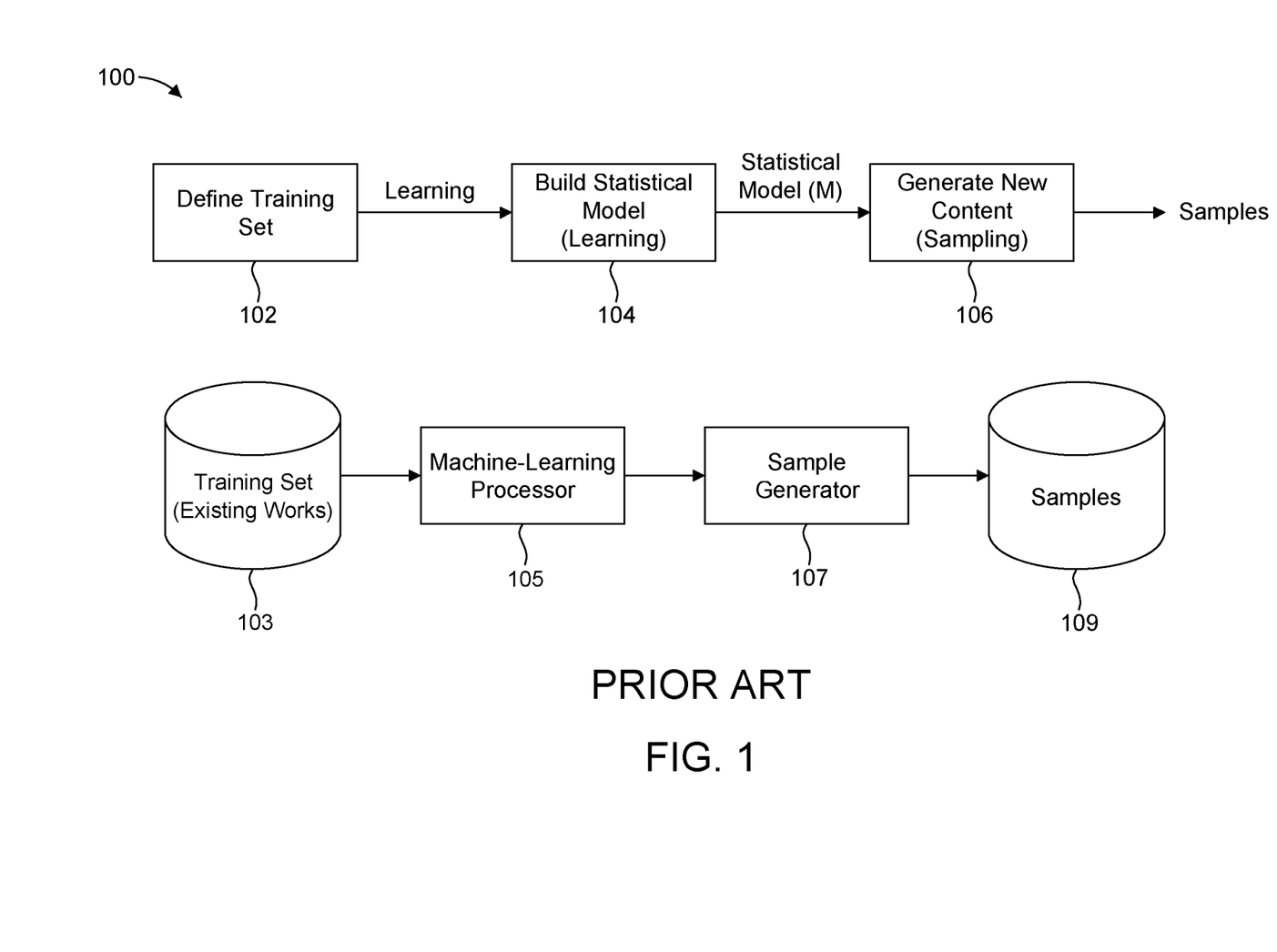
FIG. 1 illustrates a typical abstraction-instantiation scheme used for AI-based content generation.

A typical abstraction-instantiation scheme 100 as shown in FIG. 1 is used to take information from an original corpus of content and add additional information to generate new content. In a first step 102, a user defines a training set 103 consisting of a number of existing works (for instance, lead sheets by famous composers). In a second step 104, a machine-learning processor 105 applies machine-learning algorithms (e.g., Markov models, deep neural nets or other statistical learning mechanisms) to training set 103 to build a so-called "model". This is usually performed by looking at recurring statistical properties found in the training set 103. A third step 106 (the sampling phase) uses a sample generator 107 to generate new content 109 (e.g., samples) from the model.

By construction, the new content will have similar statistical properties as the ones found in the training set 103. It is commonly considered that such a procedure enables users to generate novel works of art that are stylistically close to the works in the training set, yet novel and artistically interesting.

Typical systems require building databases of existing works such as training set 103. These databases can be problematic, however, as copyright owners (typically, music publishers) may prevent their construction, manipulation, use or distribution. While the general concept of using existing works as a training set is compelling, these restrictions make their use neither desirable nor feasible. Consequently, content generating AI systems remain too limited and potentially prohibited. A technical problem associated with such systems involves generating training sets that are not subject to such restrictions.

BRIEF DESCRIPTION

Figure 4:
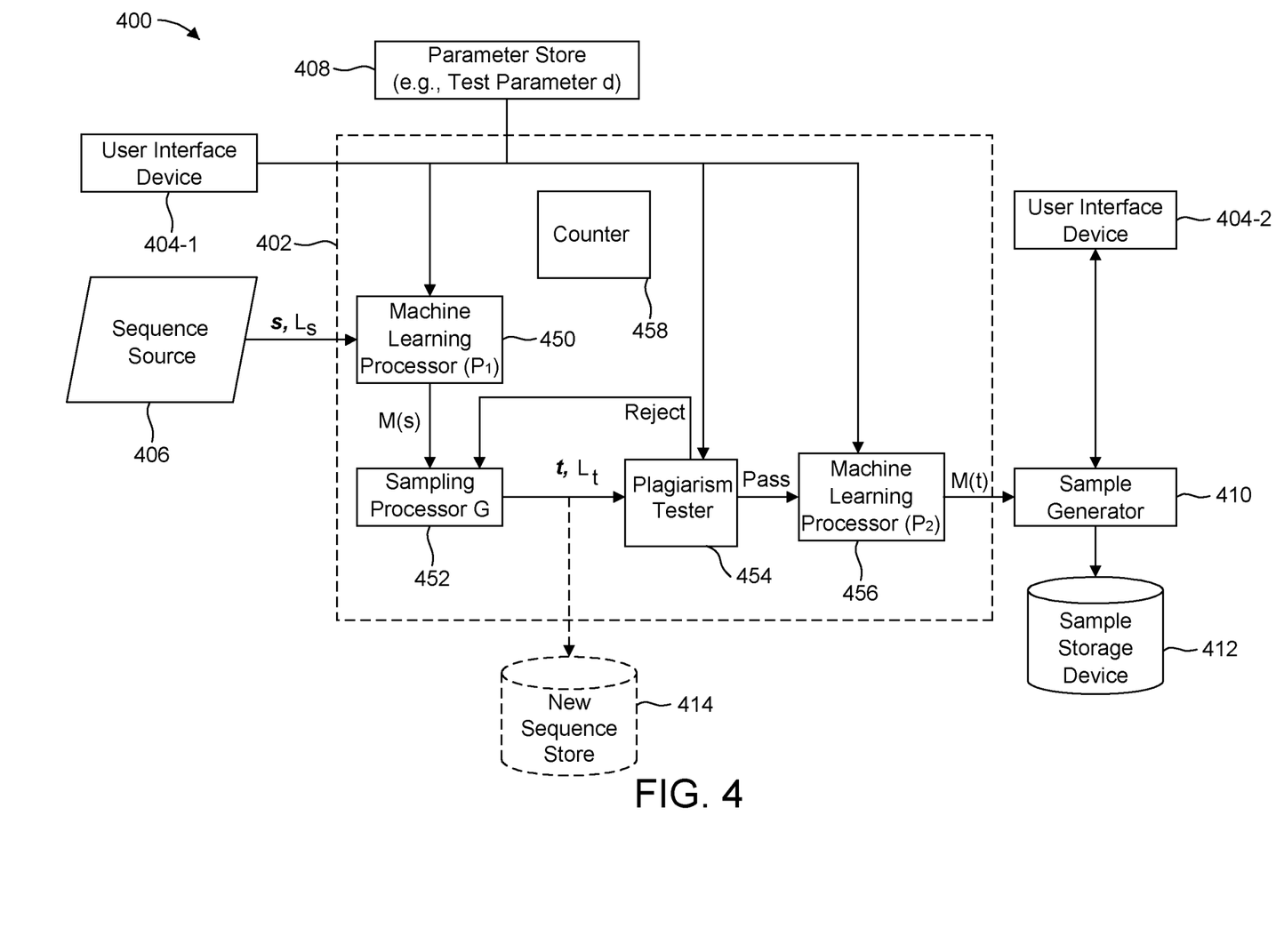
FIG. 4 illustrates an example system for cloning a model-invariant training set in which embodiments of the present invention may be employed.

The example embodiments described herein meet the above-identified needs by providing a methods, systems and computer program products for generating a training set for use during content generation. A first machine learning processor (450) is configured to apply a first machine learning process $P_1$ to a first finite sequence s wherein s has a length $L_s$, to generate a first statistical model M(s). A first sampling processor (452) is configured to sample the first statistical model M(s) using a first sampling process G to generate a second finite sequence t wherein t has a length $L_t$. A second machine learning processor (456) configured to apply a second machine learning process $P_2$ to the second finite sequence t to generate a second statistical model M(t), where no substring of the second finite sequence t of length d is identical to a substring of the first finite sequence s, and where d is a predetermined number of elements in a sequence.

In some embodiments, there is included a plagiarism tester (454) that is operable to reject any substring in second finite sequence t of length d that is identical to a substring of first finite sequence s.

In some embodiments, there is also included a counter (458) configured to count the number of rejections made by the plagiarism tester and to communicate a signal to a user interface when the number of rejections exceeds a predetermined threshold. In some embodiments, the first statistical model M(s) and the second statistical model M(t) are the same statistical model. In other embodiments, the first statistical model M(s) and the second statistical model M(t) are different statistical models.

In some embodiments, a cost function is defined by (1) a predefined distance of the first statistical model M(s) and the second statistical model M(t) and (2) the difference between $L_s$ and $L_t$, is less than or equal to a predetermined distance.

Some embodiments provide a method for generating a training set for use during content generation including applying a first machine learning process $P_1$ to a first finite sequence s wherein s has a length $L_s$, to generate a first statistical model M(s); sampling the first statistical model M(s) using a first sampling process G to generate a second finite sequence t wherein t has a length $L_t$; and applying a second machine learning process $P_2$ to the second finite sequence t to generate a second statistical model M(t), where no substring of the second finite sequence t of length d is identical to a substring of the first finite sequence s, and where d is a predetermined number of elements in a sequence.

In some embodiments, the method further includes rejecting any substring in second finite sequence t of length d that is identical to a substring of first finite sequence s. In some embodiments, the method further includes counting the number of rejections and communicating a signal to a user interface when the number of rejections exceeds a predetermined threshold.

In some embodiments, the first statistical model M(s) and the second statistical model M(t) are the same statistical model. In yet other embodiments, the first statistical model M(s) and the second statistical model M(t) are different statistical models.

In other embodiments, a cost function is defined by (1) a predefined distance of the first statistical model M(s) and the second statistical model M(t) and (2) the difference between $L_s$ and $L_t$, is less than or equal to a predetermined distance.

In some embodiments, there is provided a non-transitory computer-readable medium having stored thereon sequences of instructions, the sequences of instructions including instructions which when executed by a computer system causes the computer system to perform the aforementioned methods.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for model-invariant training set cloning, which are now described herein in terms of an example system for generating samples of music used to generate new music content. This description is not intended to limit the application of the example embodiments presented herein. In fact, after reading the following description, it will be apparent to one skilled in the relevant art(s) how to implement the following example embodiments in alternative embodiments (e.g., involving the generation of other types of content such as text or graphical content, or generating content by editing and revising of existing works).

Generally, a training set is cloned by collecting a number of sequences of content (initial sequences) and using the initial sequences as a training set (initial training set). In turn, the initial training set is processed according to example aspects described herein to generate a new set of non-plagiaristic sequences. In turn, a model is generated using the non-plagiaristic sequences.

Figure 2:
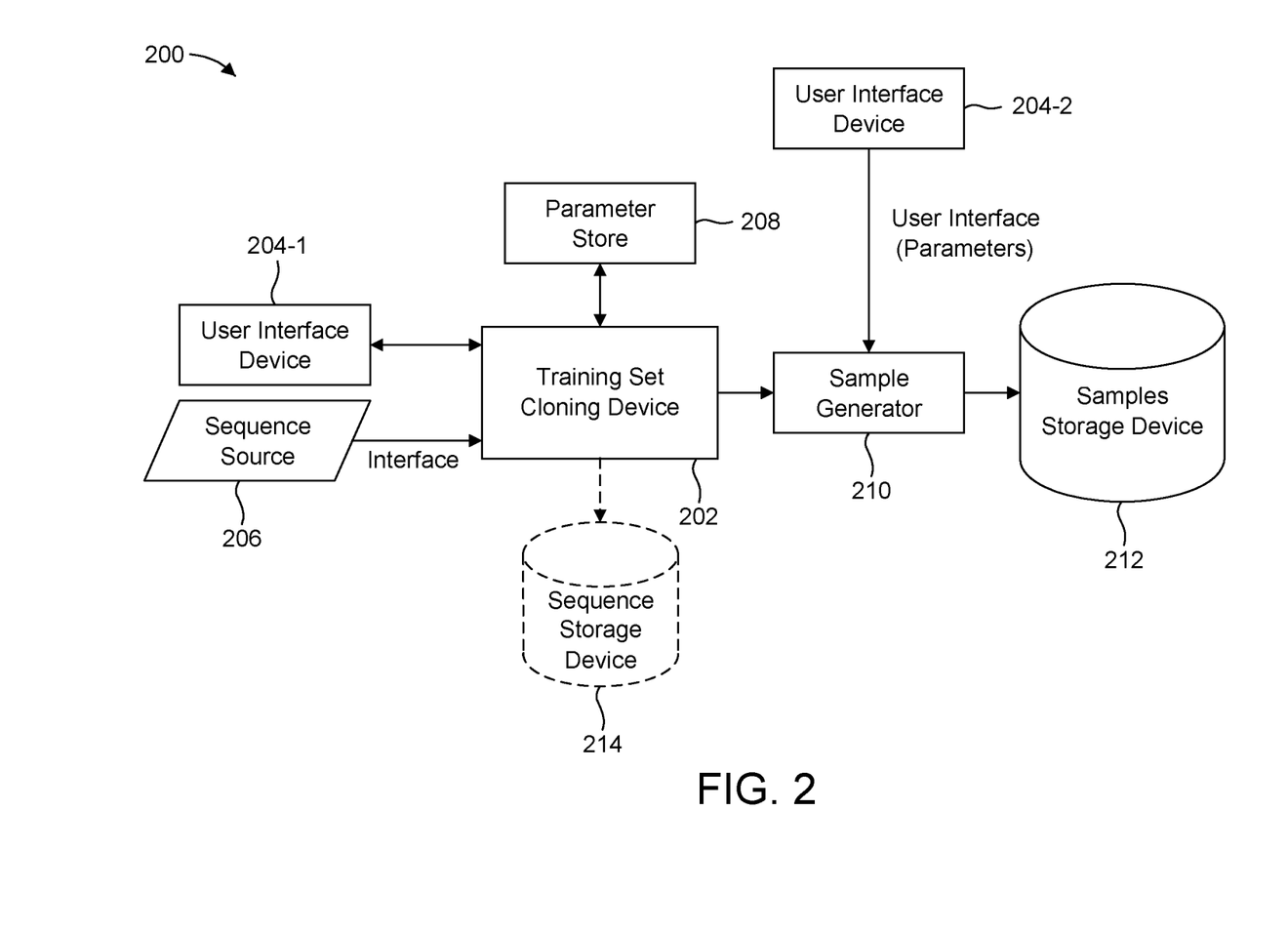
FIG. 2 is a block diagram depicting an example AI-based content generation environment wherein at least one embodiment of the present invention may be deployed.

FIG. 2 is a block diagram depicting an example AI-based content generation environment 200 including a training set cloning device 202, one or more user interface devices 204-1, 204-2 (collectively and individually referred to simply as user interface device 204), a sequence source 206, a parameter storage device 208, a sample generator 210, a sample storage device 212 and an optional sequence storage device 214. The content generation environment 200 is used to perform model-invariant training set cloning and generate new sequences that can be used to, for example, generate samples than can be incorporated into new music content.

Sequence source 206 is communicatively coupled to training set cloning device 202 and arranged to supply to the training set cloning device 202 a finite sequence of symbols s that are chosen from an alphabet. The finite sequence of symbols is referred to for simplicity as first finite sequence s. In an example embodiment, the first finite sequence s has a length $L_s$. Training set cloning device 202 is arranged to receive as input the first finite sequence s. The training set cloning device 202 is also arranged to receive one or more parameters. The one or more parameters can be prestored, for example, in parameter store 208. Symbols s can be derived from, for example, lead sheets containing a plurality of elements (e.g., chord sequences, subsequences, melodic fragments (i.e., notes), rhythm, harmony, etc.).

A subsequence of a sequence is another sequence made of elements of the sequence appearing in the same order, but not necessarily contiguous. For instance, "cdra" is a subsequence of "abracadabra", but is not a substring. A substring of a sequence is a contiguous subsequence of the sequence. For instance, "cada" is a substring of "abracadabra".

In an example embodiment, a parameter stored in parameter store 208 is a plagiarism threshold parameter d, where plagiarism threshold parameter d is a positive integer value representing an amount of allowable plagiarism. For example, plagiarism threshold parameter d can represent a number of elements in a sequence. Using as input first finite sequence s, training set cloning device 202 generates a second finite sequence t. Training set cloning device 202 is configured to generates a second finite sequence t where for any substring of the second finite sequence t that is of length d is identical to a substring of length d of finite string s. The second finite sequence t is non-plagiaristic with respect to s and d because no substring of the second finite sequence t of length d is identical to a substring of first finite sequence s.

It should be understood that other criteria for determining the amount of plagiarism can be used. Accordingly, other plagiarism threshold parameters can be used instead of plagiarism threshold parameter d. Alternatively, other plagiarism threshold parameters can be used in conjunction with plagiarism threshold parameter d.

It should be understood that while a sequence source of the initial sequence (also referred to as the initial training set) is described in terms of supplying only one sequence of length $L_s$, the supply and use of multiple sequences $S_1, S_2, \ldots, S_n$, where n is an integer, are contemplated and still within the scope of the example embodiments described herein.

A cost function is a function used to predict the cost associated with a certain action or a certain level of output. A cost function can be a function that an artificial neural network wants to minimize. This can be represented as the difference between a target and the network's output. (e.g. mean absolute error, mean square error). Different cost functions implement different notions of "distance" between the target and the network output (e.g. softmax cross-entropy, Kullback-Leibler (KL) divergence), but the general idea remains the same: the cost function gives a distance metric, and the network tries to make the distance negligible. In an example embodiment, training set cloning device 202 can be configured to generate a model of the second finite sequence t such that a cost function defined by (1) a predefined distance of the two models it generates (i.e., the model generated by applying a machine learning algorithm to first finite s and the model generated by applying a machine learning algorithm to the second finite sequence t) and (2) the difference between $L_s$ and $L_t$, is minimized.

The model of the second finite sequence t, in turn, can be provided to a sample generator 210 to generate samples of content that can be stored, for example, in a storage device such as sample storage device 212 depicted in FIG. 2.

Interface device 204-2 can be communicatively coupled to sample generator 210 to permit a user to enter parameters that adjust the sampling particulars performed by sample generator 210 (e.g., a length of the sequence, a number of sequences, one or more constraints for music generation tasks, and the like).

In an optional embodiment, a sequence storage device 214 is communicatively coupled to training set cloning device 202 and arranged to store the second finite sequences t that are generated by training set cloning device 202.

Figure 3A:
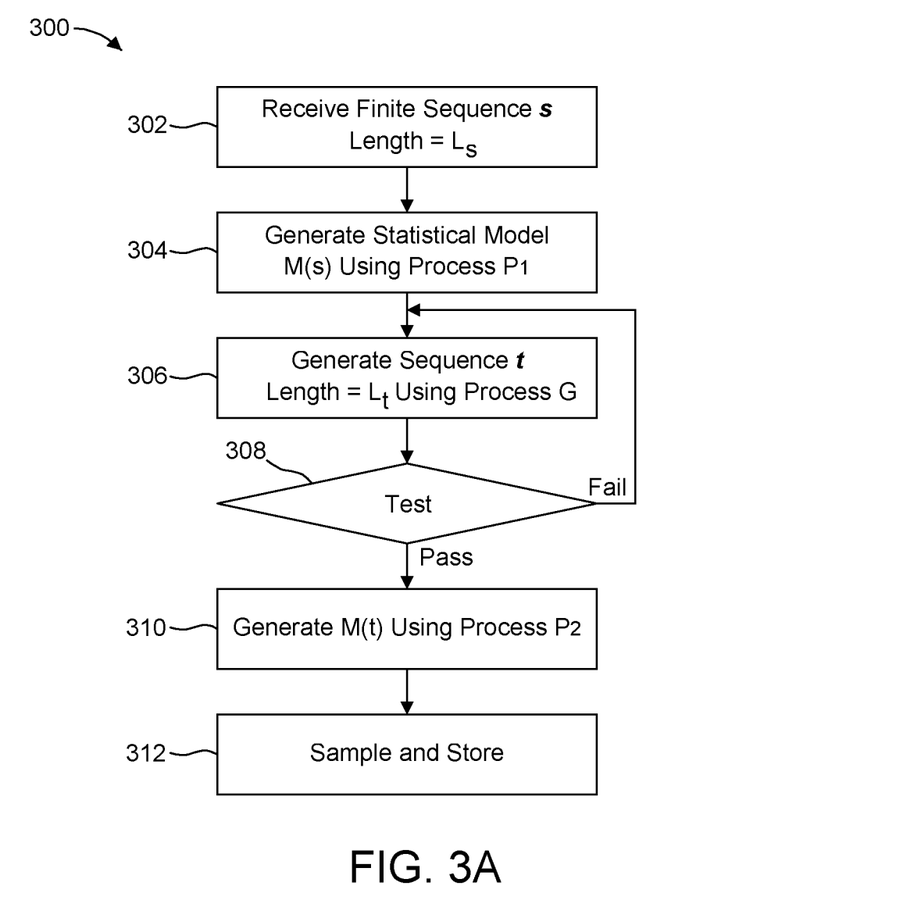
FIG. 3A is a flowchart of an example process for cloning a model-invariant training set in accordance with an example embodiment of the present invention.

FIG. 3A is a flowchart of an example process 300 for cloning a model-invariant training set. With reference to FIGS. 2 and 3A, at block 302, training set cloning device 202 receives a first finite sequence s having length $L_s$, where $L_s$ is an integer representing the number of elements in sequence s. At block 304, training set cloning device 202 generates a statistical model M(s) by applying a first predetermined machine learning process $P_1$ to sequence s (M(s) is also referred to herein as a first statistical model; $P_1$ is also referred to herein as a first machine learning process). At block 306 training set cloning device 202 samples statistical model M(s) using a predetermined sampling process G to generate a sequence t having length $L_t$, where $L_t$ is an integer representing the number of elements in sequence t.

At block 308, training set cloning device 202 performs a test to confirm that a sequence generated by sampling model M(t) is non-plagiaristic as compared to a sequence generated by using statistical model M(s). Block 308 may also be referred to as a plagiarism test.

In one example embodiment, block 308 determines whether any substring of sequence t of length d is identical to a substring of the initial sequence s. It should be understood that block 308 can perform a different plagiarism test to determine whether M(t) is non-plagiaristic as compared to the sequence generated using statistical model M(s). Accordingly, in some embodiments block 308 can be one of plural selectable plagiarism tests. Which plagiarism test is used can be controlled via, for example, user interface 204-1 or user interface 204-2. In some embodiments, user interface 204-1 and user interface 204-2 are different interfaces. In some embodiments, user interface 204-1 and user interface 204-2 are the same.

In another example embodiment, block 308 measures (1) the distance between statistical model M(s) and statistical model M(t) and (2) the difference in length of $L_s$ and $L_t$ are measured. If the distance between statistical model M(s) and statistical model M(t) are within a first predetermined threshold and the difference in length of $L_s$ and $L_t$ are within a second predetermined threshold, a determination is made at block 310 that the test has passed.

If the plagiarism test (e.g., block 308) has passed, at block 310, a second predetermined machine learning process $P_2$ is applied to sequence t to generate a statistical model M(t) (also referred to as a second statistical model).

In one embodiment, the machine learning algorithms applied to the first finite sequence s and the second finite sequence t (i.e., $P_1$ and $P_2$) are the same. In an alternative embodiment the machine learning algorithms applied to the first finite sequence s and the second finite sequence t (i.e., $P_1$ and $P_2$) are different.

In turn, samples of M(t) can be obtained and stored for further processing, as shown in block 312. Music content can be generated using the samples using, for example, a music generator (not shown). If the second finite sequence t is rejected, then block 308 causes procedure 300 to generate another second finite sequence t at block 306 by sampling the statistical model M(s) again using the predetermined sampling process G. As noted above, optionally, a second finite sequence t can be stored. In one embodiment, each second finite sequence t is stored, whether or not it has passed a plagiarism test. In another embodiment, only a second finite sequence t that has passed the plagiarism test is stored.

In one example embodiment a counter 458 counts the number of iterations the plagiarism test 308 causes procedure 300 to retry to generate a non-plagiaristic sequence. If the number of counts reaches a predetermined number, process 300 can exit and provide a signal to an operator via user interface device 204-1. In turn, an operator can adjust parameters (e.g., sampling parameters) also, for example via user interface device 204-1.

Figure 3B:
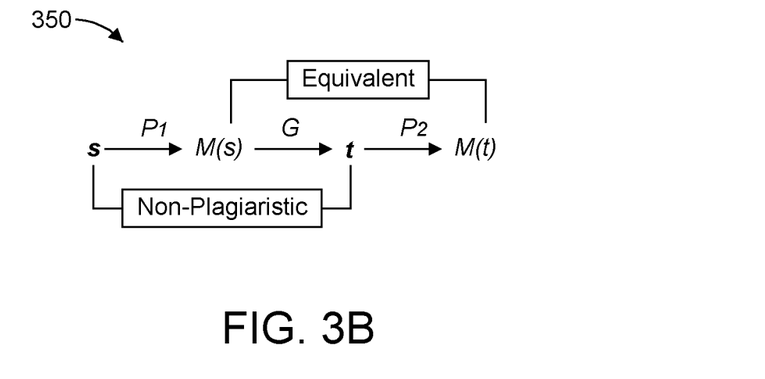
FIG. 3B is a symbolic representation of a process for generating a model-invariant training set in accordance with an example embodiment of the present invention.

FIG. 3B is a symbolic representation 350 of the process for generating a model-invariant training set in accordance with the example embodiment of the present invention described above in connection with FIG. 3A. As shown in FIG. 3B, sequence t is not plagiaristic as compared to sequence s, while statistical model M(s) and statistical model M(t) are equivalent.

FIG. 4 illustrates an example system 400 for cloning a model-invariant training set in which embodiments of the present invention may be employed. Similar to the components described above in connection with FIG. 2, system 400 includes a training set cloning device 402, user interface devices 404-1, 404-2 (collectively and individually referred to simply as user interface device 404), a sequence source 406, a parameter storage device 408, a sample generator 410, a sample storage device 412 and an optional sequence storage device 414. System 400 enables model-invariant training set cloning that allows for the generation of sequences that can be used, for example, to generate samples that can be incorporated into new content (e.g., music content). Sequence source 406 is communicatively coupled to training set cloning device 402 and is arranged to supply to the training set cloning device 402 a finite sequence of symbols chosen from an alphabet (a first finite sequence s). In an example embodiment, the first finite sequence is represented as s and has a length $L_s$. Training set cloning device 402 is arranged to receive as input the first finite sequence s and as well as one or more parameters stored in parameter store 410. An example parameter is plagiarism threshold parameter d which is a positive integer value representing an amount of allowable plagiarism. In one example embodiment, plagiarism threshold parameter d represents a predetermined number of elements in a sequence.

Using as input first finite sequence s training set cloning device 402 generates a second finite sequence t which is non-plagiaristic with respect to first finite sequence s and length d. In one example embodiment, no substring of second finite sequence t of length d is identical to a substring of first finite sequence s. Other criteria for determining the amount of plagiarism can be used. Accordingly, other plagiarism threshold parameters can be used instead of plagiarism threshold parameter d. Alternatively, other plagiarism threshold parameters can be used in conjunction with plagiarism threshold parameter d.

Training set cloning device 402 is further enabled to generate a model of the second finite sequence t. The model of the second finite sequence t, in turn, can be provided to a sample generator 410 to sample second finite sequence t, thereby generating samples of content that can be stored, for example, in a storage device, such as sample storage device 412. Interface device 404-2 can be communicatively coupled to sample generator 410 to permit a user to enter parameters that adjust the sampling particulars performed by sample generator 410. Example parameters include a length of the sequence, a number of sequences, one or more constraints for music generation tasks (e.g., notes to end on), and the like.

In some example embodiments, interface device 404-1 and interface 404-2 are different. In other example embodiments, interface device 404-1 and interface 404-2 are the same.

In the example embodiment shown in FIG. 2, training set cloning device 402 includes a first machine learning processor 450, a sampling processor 452, a plagiarism tester 454, and a second machine learning processor 456.

First machine learning processor 450 is enabled to generate a statistical model, M(s), by applying a first predetermined machine learning process $P_1$ to first finite sequence s (M(s) is also referred to as a first statistical model; $P_1$ is also referred to herein as a first machine learning process). Sampling processor 452 is enabled to sample the statistical model M(s) using a predetermined sampling process G to generate a second finite sequence t having length $L_t$, where $L_t$ is an integer representing the number of elements in sequence t. Plagiarism tester 454 is enabled to test second finite sequence t to confirm that a sequence generated by sampling model M(t) is non-plagiaristic as compared to a sequence generated by sampling statistical model M(s).

For example, plagiarism tester 454 receives as input second finite sequence t and parameter d, where d represents a predetermined number of elements of a sequence. Plagiarism tester 454 then checks whether any substring in second finite sequence t of length d is identical to a substring of sequence s. If so, it will reject the second finite sequence t that has a substring of length d (or longer). Otherwise, the substring of finite substring t will be accepted. If rejected, training set cloning device 402 causes a new finite sequence to be generated by sampling the first statistical model M(s) again. This procedure will continue until a sequence t passes the test performed by the plagiarism tester 454.

In an alternative embodiment, plagiarism tester 454 is enabled to measure (1) the distance between statistical model M(s) and statistical model M(t) and (2) the difference in length of $L_s$ and $L_t$. Plagiarism tester 454 then makes a determination as to whether the distance between statistical model M(s) and statistical model M(t) are within a first predetermined threshold and the difference in length of $L_s$ and $L_t$ are within a second predetermined threshold. If so, plagiarism tester 454 passes the sequence t to the following stage of training set cloning device 402. If the test component determines that the sequence t has passed the second machine learning processor 456 applies a second predetermined machine learning process P to sequence t to generate a statistical model M(t)(also referred to as second statistical model).

In an example aspect of the present invention, a second machine learning process $P_2$, applied to second finite sequence t, creates a model M(t), minimizing a cost function defined by (1) a predefined distance between M(s) and M(t) and (2) the difference between length $L_s$ and length $L_s$.

The newly generated sequences, t, have at least two properties: (1) they are not plagiaristic with respect to the initial sequences and (2) a model constructed from the newly generated sequences is substantially similar or equal to a model that is generated from the initial sequences. As a result, the newly generated sequences (or non-plagiaristic sequences) can be used, performed or otherwise output to another processing system in lieu of the initial sequences, alleviating the need for copyright clearance of the original sequences in the training set.

In one example embodiment, the first machine learning processor 450 and second machine learning processor 456 execute the same machine learning algorithm ($P_1=P_2$). In another example embodiment, the first machine learning processor 450 and second machine learning processor 456 use different machine learning algorithms ($P_1 \neq P_2$).

While using a single sequence based on a generate- and test type procedure to solve the optimization problem as described above allows a training set to be cloned such that the model resulting from the clone is equivalent to an initial model such that the cloned set does not plagiarize the training set, other implementations can be utilized that are still within the scope of the present invention.

As described above, in an optional embodiment, a sequence storage device 414 is communicatively coupled to training set cloning device 402 and arranged to store the second finite sequences t generated by training set cloning device 402. As shown in FIG. 4, sequence storage device 414 is arranged to receive each second finite sequence t regardless of whether the second finite sequence t has pasted a plagiarism test (e.g., block 308 of FIG. 3) performed by plagiarism test 454 because it is communicatively coupled so as to receive all second finite sequences t generated by sampling processor 452. In another embodiment (not shown) sequence storage device 414 can be arranged to store only a second finite sequence that has past a plagiarism test performed by plagiarism tester 454.

In some embodiments, a MaxOrder automaton is used to generate non-plagiaristic sequences. In such an implementation, a non-plagiaristic constraint is taken into account within the machine learning process that creates the second finite sequence t.

In one example embodiment, given a Markov model M, trained from a training set, a non-plagiaristic training set T' is sought, particularly a training set T' that yields a Markov model "similar" to model M, where similarity is tested based on the Kullback-Leibller distance between Markov models (e.g., where the distance meets a similarity threshold). The advantage of using MaxOrder, is that it efficiently generates from M sequences that are non-plagiaristic with respect to T. That is, the computational efficiency is greater. This is because while in this embodiment a test of the distance between models (between M and a model trained from T') is performed, it is not necessary to perform the non-plagiaristic test described above, namely, a test that determines whether any second finite substring of length d is identical to a substring of length d of finite string s. The latter test can still be performed as an optional secondary test.

Figure 5:
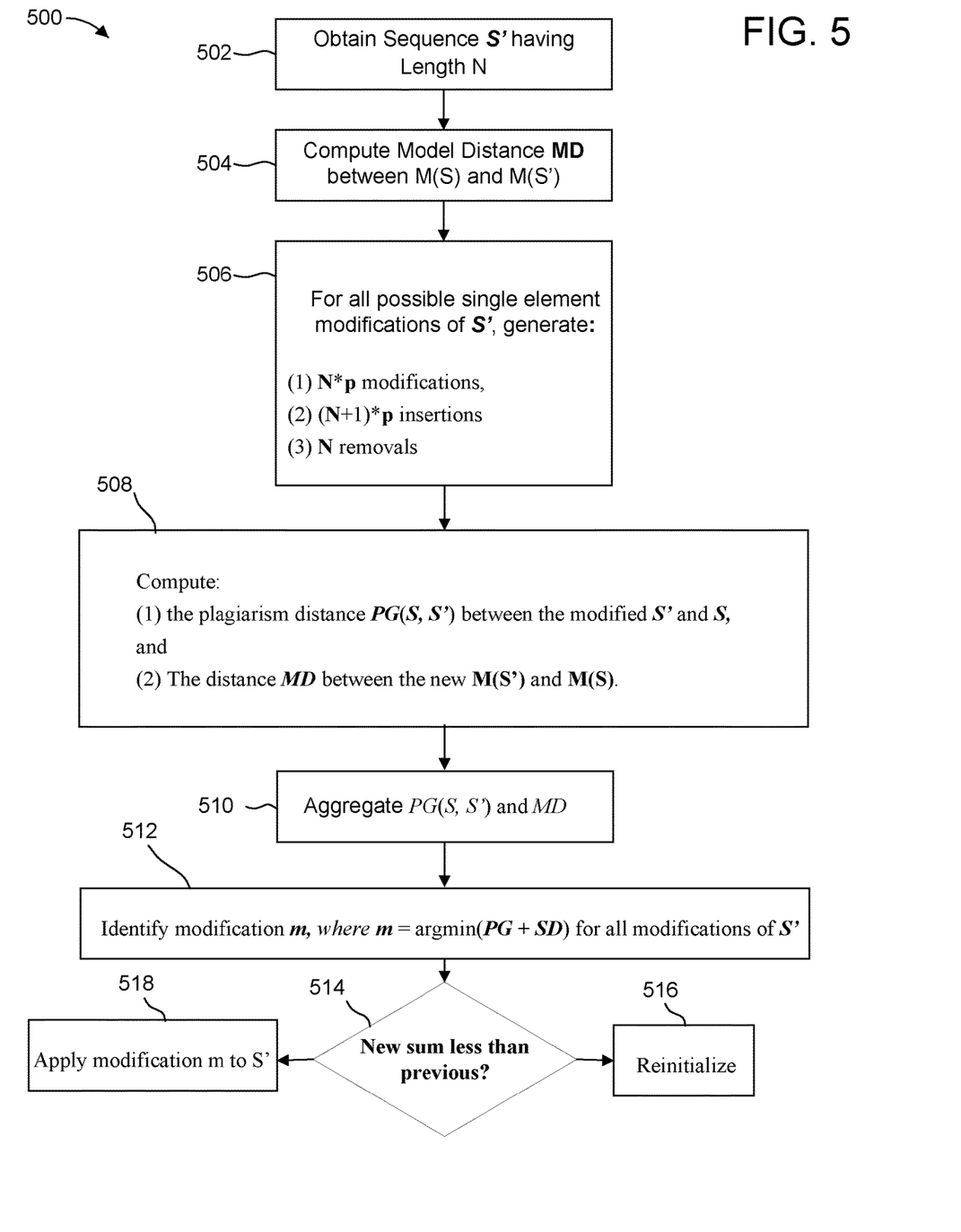
FIG. 5 illustrates a flowchart of an example operational implementation for use in a general case in accordance with an example embodiment.

FIG. 5 illustrates a flowchart of an example operational implementation for use in a general case (i.e. not necessarily a Markov model as described above, but any statistical model, e.g. a recurrent neural network (RNN), long short-term memory (LSTM), or any other model with a set of parameters). In this example, a new training set T' is determined such that T' is non plagiaristic with regards to the initial training set T, such that T' generates a similar statistical model as T.

A first sequence S of elements A, where A is an alphabet A: $a_1, \ldots, a_p$ is considered in this example implementation. An assumption is made that a learning algorithm produces a model M(S) given the first sequence S. Model M(S) consists of a set of parameters $p_1, \ldots, p_n$, which are typically real numbers. In addition, an assumption is made that a plagiaristic distance measure PG(S, S') exists between two (2) sequences, the first sequence S and a second sequence S' of length N. Such a distance measure PG(S, S') may be defined as follows:

For each element $s_i$ of S', where i is an integer, the maximum prefix size maxPrefixSize(i) is computed such that maxPrefixSize(i) is the length of the longest prefix that ends at i and which exists verbatim in S;

The value of maxPrefixSize(i) is summed for all elements of the second sequence S' and divided by the length N of the second sequence S':

Distance measure PG(S, S') is performed in accordance with Equation (1):

$$PG(S',S)=\Sigma_{i=1,N} \text{maxPrefixSize}(i)/N \qquad (1)$$

The training set that is considered is defined by a single sequence S of length N and the associated model M(S) is the target model.

In some embodiments, the process starts from a second sequence S' of length N, where the second sequence S' can be 1) random, 2) a copy of S, 3) generated/sampled from M(S), as shown at block 502.

At block 504 a model distance MD between M(S) and M(S') is computed. There are several ways to compute this distance. For example by using:

MSE (means square error) computed on all parameters

Cross-entropy between the set of parameters p and p', where p is a set of parameters $p_1, \ldots, p_n$ for M(S) and p' is a set of parameters $p'_1, \ldots, p'_n$ for M(S)

At block 506 a loop commences as follows. All possible single element modifications of S' are considered, obtained either by 1) modifying a value of an element at position i, 2) inserting an element at position i, or 3) removing the element at position i. Where there are N modification indexes and N+1 insertion positions, this results in:

(1) N*p modifications (based on N modification indexes),
(2) (N+1)*p insertions (based on N+1 insertions positions), and
(3) N removals.

The total of possible modifications for S' is (2N+1)*p+N. At block 508, for each of the modifications, the following is computed:

(1) The plagiarism distance PG(S, S') between the modified S' and S; and
(2) The distance MD between the new M(S') and M(S).

In block 510, the plagiarism distance PG(S, S') and the model distance MD are aggregated using for instance the sum PG+MD. At block 512, the modification m that minimizes the sum is identified, i.e. m=argmin(PG+SD) for all modifications of S'. At block 514, a determination is made whether the new sum PG+MD is less that the previous one. If a determination is made at block 514 that the new sum PG+MD is not less that the previous one, then S' is reinitialized (e.g., a new random sequence of length N is obtained), as shown at block 516. Else, at block 518 the modification m is applied to S' and the loop ends.

After a given number of iterations the process 500 terminates and returns the final S'. It should be understood that there are many ways to optimize this process, for example by avoiding considering all modifications and choosing modifications at random, avoiding computing the distance MD for too plagiaristic sequences, and the like. Thus, it should be further understood that the above examples are not limiting.

Moreover, alternative processes for minimizing the distance of the model parameters exist. Indeed, other mechanisms enabling cost function minimization can be utilized and still be within the scope of the invention.

Figure 6:
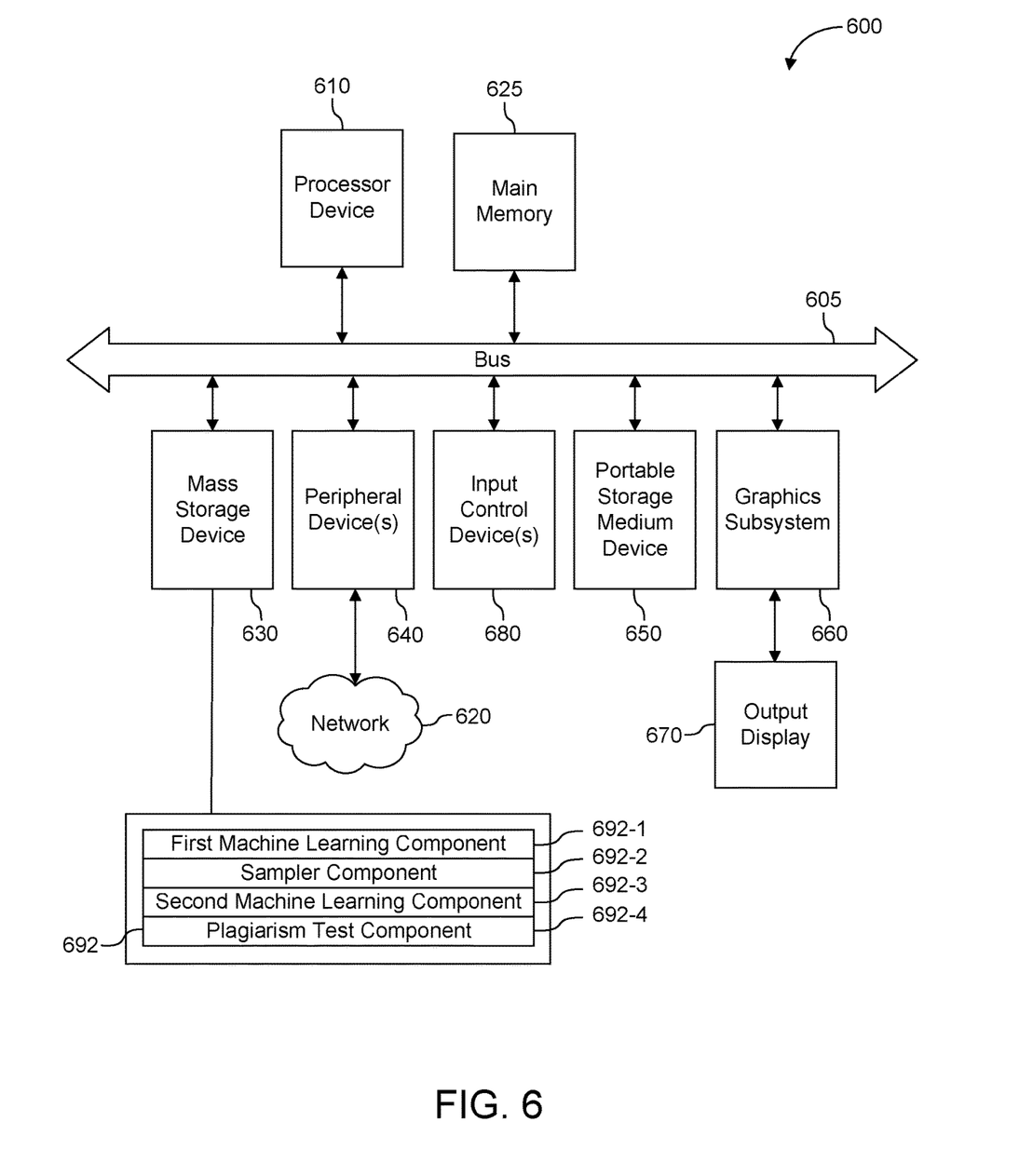
FIG. 6 is a block diagram for explaining a system for cloning a model-invariant training set according to the example embodiments described herein.

FIG. 6 is a block diagram for explaining of a system 600 for cloning a model-invariant training set, in accordance with some of the example embodiments described herein.

The system 600 includes a processor device 610, a main memory 625, and an interconnect bus 605. The processor device 610 may include without limitation a single microprocessor, or may include a plurality of microprocessors for configuring the system 600 as a multi-processor system. The main memory 625 stores, among other things, instructions and/or data for execution by the processor device 610. The main memory 625 may include banks of dynamic random access memory (DRAM), as well as cache memory.

System 600 may further include a mass storage device 630, peripheral device(s) 640, portable non-transitory storage medium device(s) 650, input control device(s) 680, a graphics subsystem 660, and/or an output display interface 670. For explanatory purposes, all components in system 600 are shown in FIG. 6 as being coupled via the bus 605. However, the system is not so limited. Elements of system 600 may be coupled via one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 630 may be a nonvolatile storage device for storing data and/or instructions for use by the processor device 610. The mass storage device 630 may be implemented, for example, with a magnetic disk drive or an optical disk drive.

In a software embodiment, the mass storage device 630 is configured for loading contents of the mass storage device 630 into the main memory 625.

Mass storage device 630 additionally stores instructions which, when executed by processor device 610, operate as a training set cloning component 692, which performs the functions described above in connection with training set cloning device 402. Instructions that cause processor device 610 to act as a first machine learning component 692-1, a sampling component 692-2, a second machine learning component 692-3, and a plagiarism tester component 692-4 are also stored in mass storage device 630, and operate to perform the functions described above in connection with first machine learning processor 450, sampling processor 452, second machine learning processor 456, and plagiarism tester 454, correspondingly.

The portable storage medium device 650 operates in conjunction with a nonvolatile portable storage medium, such as, for example, flash memory, to input and output data and code to and from the system 600. In some embodiments, the software for storing information may be stored on a portable storage medium, and may be inputted into the system 600 via the portable storage medium device 650. The peripheral device(s) 640 may include any type of computer support device, such as, for example, an input/output (I/O) interface configured to add additional functionality to the system 600. For example, the peripheral device(s) 640 may include a network interface card for interfacing the system 600 with a network 620.

The input control device(s) 680 provide a portion of the user interface for a user of the system 600. The input control device(s) 680 may include a keypad and/or a cursor control device. The keypad may be configured for inputting alphanumeric characters and/or other key information. The cursor control device may include, for example, a handheld controller or mouse, a trackball, a stylus, and/or cursor direction keys. The system 600 may include an optional graphics subsystem 660 and output display 670 to display textual and graphical information. The output display 670 may include a display such as a CSTN (Color Super Twisted Nematic), TFT (Thin Film Transistor), TFD (Thin Film Diode), OLED (Organic Light-Emitting Diode), AMOLED display (Activematrix organic light-emitting diode), and/or liquid crystal display (LCD)-type displays. The displays can also be touchscreen displays, such as capacitive and resistive-type touchscreen displays.

The graphics subsystem 660 receives textual and graphical information, and processes the information for output to the output display 670.

Input control devices 680 can control the operation and various functions of system 600.

Input control devices 680 can include any components, circuitry, or logic operative to drive the functionality of system 600. For example, input control device(s) 680 can include one or more processors acting under the control of an application.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-6 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A computer-implemented system for generating a training set for use during content generation, comprising:
a first machine learning processor configured to apply a first machine learning process $P_1$ to a first finite sequence s wherein s has a length $L_s$, to generate a first statistical model M(s);
a first sampling processor configured to sample the first statistical model M(s) using a first sampling process G to generate a second finite sequence t wherein t has a length $L_t$;
a second machine learning processor configured to apply a second machine learning process $P_2$ to the second finite sequence t to generate a second statistical model M(t); and
a plagiarism tester operable to reject any substring in second finite sequence t of length d that is identical to a substring of first finite sequence s,
wherein no substring of the second finite sequence t of length d is identical to a substring of the first finite sequence s, wherein d is a predetermined number of elements in a sequence.

2. The system according to claim 1, further comprising: a counter configured to count the number of rejections made by the plagiarism tester and to communicate a signal to a user interface when the number of rejections exceeds a predetermined threshold.

3. The system according to claim 1, further comprising: wherein the first statistical model M(s) and the second statistical model M(t) are the same statistical model.

4. The system according to claim 1, further comprising: wherein the first statistical model M(s) and the second statistical model M(t) are different statistical models.

5. The system according to claim 1, wherein a cost function defined by 1) a predefined distance of the first statistical model M(s) and the second statistical model M(t) and 2) the difference between Ls and Lt, is less than or equal to a predetermined distance.

6. A method for generating a training set for use during content generation, comprising:
applying a first machine learning process $P_1$ to a first finite sequence s wherein s has a length $L_s$, to generate a first statistical model M(s);
sampling the first statistical model M(s) using a first sampling process G to generate a second finite sequence t wherein t has a length Lt;
applying a second machine learning process $P_2$ to the second finite sequence t to generate a second statistical model M(t); and
applying a plagiarism tester to reject any substring in second finite sequence t of length d that is identical to a substring of first finite sequence s,
wherein no substring of the second finite sequence t of length d is identical to a substring of the first finite sequence s, wherein d is a predetermined number of elements in a sequence.

7. The method according to claim 6, further comprising: counting the number of rejections; and
communicating a signal to a user interface when the number of rejections exceeds a predetermined threshold.

8. The method according to claim 6, further comprising: wherein the first statistical model M(s) and the second statistical model M(t) are the same statistical model.

9. The method according to claim 6, further comprising: wherein the first statistical model M(s) and the second statistical model M(t) are different statistical models.

10. The method according to claim 6, wherein a cost function defined by (1) a predefined distance of the first statistical model M(s) and the second statistical model M(t) and (2) the difference between Ls and Lt, is less than or equal to a predetermined distance.

11. A non-transitory computer-readable medium having stored thereon sequences of instructions, the sequences of instructions including instructions which when executed by a computer system causes the computer system to perform:
applying a first machine learning process $P_1$ to a first finite sequence s wherein s has a length $L_s$, to generate a first statistical model M(s);
sampling the first statistical model M(s) using a first sampling process G to generate a second finite sequence t wherein t has a length $L_t$;
applying a second machine learning process $P_2$ to the second finite sequence t to generate a second statistical model M(t); and
applying a plagiarism tester operable to reject any substring in second finite sequence t of length d that is identical to a substring of first finite sequence s,
wherein no substring of the second finite sequence t of length d is identical to a substring of the first finite sequence s, wherein d is a predetermined number of elements in a sequence.

12. The computer-readable medium according to claim 11, further having stored thereon a sequence of instructions for causing the one or more processors to perform:
   counting the number of rejections; and
   communicating a signal to a user interface when the number of rejections exceeds a predetermined threshold.

13. The computer-readable medium according to claim 11, wherein the first statistical model M(s) and the second statistical model M(t) are the same statistical model.

14. The computer-readable medium according to claim 11, wherein the first statistical model M(s) and the second statistical model M(t) are different statistical models.

15. The computer-readable medium according to claim 11, wherein a cost function defined by (1) a predefined distance of the first statistical model M(s) and the second statistical model M(t) and (2) the difference between Ls and Lt, is less than or equal to a predetermined distance.

* * * * *

UNITED STATES PATENT AND TRADEMARK OFFICE
CERTIFICATE OF CORRECTION

PATENT NO. : 11,593,702 B2
APPLICATION NO. : 16/434668
DATED : February 28, 2023
INVENTOR(S) : François Pachet and Pierre Roy Page 1 of 1

It is certified that error appears in the above-identified patent and that said Letters Patent is hereby corrected as shown below:

On the Title Page

Column 1 below Prior Publication Data, US 2020/0074343 A1, Mar. 5, 2020, insert --Foreign Application Priority Data, Sep. 5, 2018 (SE).............................1851056--.

In the Claims

In Claim 5, Column 12, Line 12 "Ls and Lt" should read "$L_s$ and $L_t$".

In Claim 6, Column 12, Line 21 "Lt" should read "$L_t$".

In Claim 10, Column 12, Line 46 "Ls and Lt" should read "$L_s$ and $L_t$".

In Claim 15, Column 13, Line 17-18 "Ls and Lt" should read "$L_s$ and $L_t$".

Signed and Sealed this
Twenty-fifth Day of July, 2023

Katherine Kelly Vidal
*Director of the United States Patent and Trademark Office*